(12) United States Patent
Hoshino et al.

(10) Patent No.: US 10,646,312 B2
(45) Date of Patent: May 12, 2020

(54) ORAL CLEANING DEVICE

(71) Applicant: PANASONIC INTELLECTUAL PROPERTY MANAGEMENT CO., LTD., Osaka (JP)

(72) Inventors: Junichi Hoshino, Shiga (JP); Tadanobu Kitagawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

(21) Appl. No.: 15/900,628

(22) Filed: Feb. 20, 2018

(65) Prior Publication Data
US 2018/0256300 A1 Sep. 13, 2018

(30) Foreign Application Priority Data

Mar. 8, 2017 (JP) .................................. 2017-043511

(51) Int. Cl.
| | | |
|---|---|---|
| A61C 17/02 | (2006.01) | |
| A61C 17/028 | (2006.01) | |
| B08B 3/02 | (2006.01) | |
| A61C 1/00 | (2006.01) | |

(52) U.S. Cl.
CPC ........ *A61C 17/0202* (2013.01); *A61C 1/0015* (2013.01); *A61C 17/0205* (2013.01); *A61C 17/028* (2013.01); *B08B 3/026* (2013.01); *A61C 2204/002* (2013.01); *B08B 2203/0223* (2013.01)

(58) Field of Classification Search
None
See application file for complete search history.

(56) References Cited

U.S. PATENT DOCUMENTS

2014/0259474 A1* 9/2014 Sokol ................ A61C 17/0202
15/22.2

FOREIGN PATENT DOCUMENTS

| EP | 2 946 748 A1 | 11/2015 |
| JP | 2004-282480 A | 10/2004 |
| JP | 2015-217174 A | 12/2015 |
| KR | 2012126265 A | 11/2012 |

OTHER PUBLICATIONS

The Extended European Search Report dated Jun. 27, 2018 for the related European Patent Application No. 18157985.5.

* cited by examiner

*Primary Examiner* — Michael E Barr
*Assistant Examiner* — Jason P Riggleman
(74) *Attorney, Agent, or Firm* — McDermott Will & Emery LLP

(57) ABSTRACT

An oral cleaning device according to the disclosure includes a body unit including a pump configured to discharge washing liquid, a tube connected to the body unit to allow the discharged washing liquid to flow through the tube, a washing unit connected to the tube to discharge the washing liquid, a first operation part provided at the washing unit, a controller configured to control the pump in accordance with operation of the first operation part, and a communication unit configured to establish a communication connection between the first operation part and the controller.

12 Claims, 2 Drawing Sheets

ORAL CLEANING DEVICE

RELATED APPLICATIONS

This application claims the benefit of Japanese Application No. 2017-043511, filed on Mar. 8, 2017, the entire disclosure of which Application is incorporated by reference herein.

BACKGROUND

1. Technical Field

The present disclosure relates to an oral cleaning device configured to wash an intraoral cavity with washing liquid.

2. Description of the Related Art

An exemplary well-known conventional oral cleaning device includes a body unit having a tank configured to store washing liquid and a pump configured to discharge the washing liquid, a tube connected to the body unit so as to allow the washing liquid discharged by the pump to flow through the tube, and a washing unit configured to discharge the washing liquid supplied through the tube. The body unit includes a first operation part to be operated to power ON and power OFF, and a second operation part to be operated to regulate hydraulic pressure of the washing liquid discharged by the pump. A user operates the first operation part to select a power supply state of the body unit, and operates the second operation part to regulate the hydraulic pressure of the washing liquid discharged from the washing unit. Unexamined Japanese Patent Publication No. 2015-217174 discloses an exemplary conventional oral cleaning device.

SUMMARY

When a user is holding the washing unit with a single hand and is washing an intraoral cavity with the washing liquid discharged from the washing unit, the user has difficulty in operating the operation parts at the body unit.

An oral cleaning device according to an aspect of the present disclosure includes: a body unit including a pump configured to discharge washing liquid; a tube connected to the body unit to allow the discharged washing liquid to flow through the tube; a washing unit connected to the tube to discharge the washing liquid; a first operation part provided at the washing unit; a controller configured to control the pump in accordance with operation of the first operation part; and a communication unit configured to establish a communication connection between the first operation part and the controller.

The oral cleaning device according to the present disclosure achieves improvement in operation usability.

Figure 1:
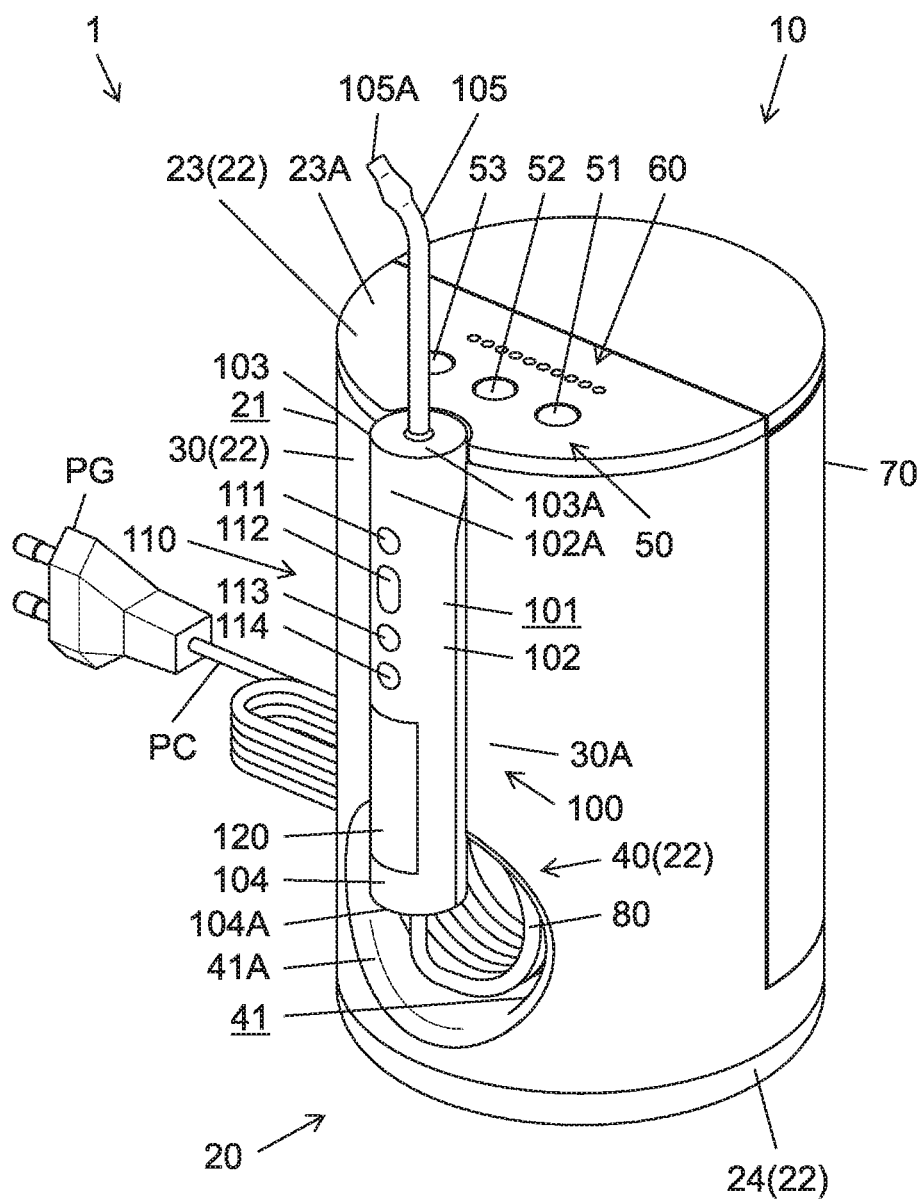
FIG. 1 is a perspective view of an oral cleaning device according to an exemplary embodiment.

DETAILED DESCRIPTION (Oral Cleaning Device in Exemplary Practicable Mode)

An oral cleaning device according to an aspect of the present disclosure includes: a body unit including a pump configured to discharge washing liquid; a tube connected to the body unit to allow the discharged washing liquid to flow through the tube; a washing unit connected to the tube to discharge the washing liquid; a first operation part provided at the washing unit; a controller configured to control the pump in accordance with operation of the first operation part; and a communication unit configured to communicably connect the first operation part and the controller. The first operation part for pump operation is provided at the washing unit. A user can thus easily regulate hydraulic pressure and the like of the washing liquid discharged from the washing unit that is washing an intraoral cavity.

The oral cleaning device is exemplarily configured such that the communication unit includes a first wireless communication part provided at the washing unit to transmit a wireless signal according to operation of the first operation part, and a second wireless communication part provided at the body unit to receive the wireless signal, and the controller controls the pump in accordance with the wireless signal received by the second wireless communication part. The washing unit and the body unit can thus communicate with each other without connection between the washing unit and the body unit via any communication line. The oral cleaning device can accordingly be simplified in wiring configuration.

The oral cleaning device is exemplarily configured such that the washing unit further includes a power supply configured to supply the first wireless communication part with electric power. The first wireless communication part can thus operate without connection between the washing unit and an external power supply via any electric power line. The oral cleaning device can accordingly be simplified in wiring configuration.

The oral cleaning device is exemplarily configured such that the washing unit further includes a display part configured to display information associated with operation of the first operation part. A user can thus easily recognize how the oral cleaning device is changed in behavior state by operation of the first operation part.

The oral cleaning device is exemplarily configured such that the washing unit further includes a power receiver configuring a contactless power transmission system. The communication unit can thus operate without connection between the washing unit and the external power supply via any electric power line. The oral cleaning device can accordingly be simplified in wiring configuration.

The oral cleaning device is exemplarily configured such that the body unit further includes a second operation part configured to select behavior of the pump. The washing unit and the body unit each have the operation part for operation of the pump. This configuration achieves improvement in operability.

The oral cleaning device is exemplarily configured such that the controller stops the behavior of the pump when the first wireless communication part and the second wireless communication part are under a poor communication condition. The pump stops when operation of the first operation part at the washing unit may not be reflected accurately in behavior of the pump. This configuration is thus less likely to cause the washing unit to discharge the washing liquid having pressure unintended by a user.

The oral cleaning device is exemplarily configured such that the washing unit includes a grip portion, and the first wireless communication part is provided at an end of the grip portion or close to the end in the grip portion. The first wireless communication part and the second wireless communication part will thus be kept in an excellent communication condition.

Exemplary Embodiment

FIG. 1 shows an outer appearance of oral cleaning device 1. Oral cleaning device 1 is used to wash an intraoral cavity, mainly to wash teeth and gums in an oral cavity. Oral cleaning device 1 is placed on a flat installation surface such as a washstand (not shown). Oral cleaning device 1 is driven by electric power supplied from an external power supply (not shown) such as a commercial power supply, and is configured to discharge washing liquid into an oral cavity. Examples of the washing liquid include clean water mixed with detergent, and clean water.

Oral cleaning device 1 includes body unit 10, tube 80, washing unit 100, and power supply cord PC. Body unit 10 is preferred to have an elliptical columnar shape or an approximately elliptical columnar shape. Body unit 10 exemplarily has the elliptical columnar shape. The elliptical columnar shape is inclusive of a columnar shape having a circular shape in a planar view. Body unit 10 includes device body 20 and tank 70. Tank 70 is configured to store washing liquid. Tank 70 is detachably attached to device body 20, for example.

Device body 20 accommodates various elements necessary for driving oral cleaning device 1. Device body 20 includes housing 21, pump 31, a motor (not shown), and body circuit 32 (see FIG. 2). Housing 21 accommodates pump 31, the motor, and body circuit 32. Pump 31 is configured to discharge the washing liquid stored in tank 70. The motor is configured to drive pump 31. Body circuit 32 includes controller 33 and power supply circuit 34 (see FIG. 2). Controller 33 is configured to control pump 31. Power supply circuit 34 is configured to supply electric power to electrical elements included in oral cleaning device 1. The electrical elements of oral cleaning device 1 include the motor, controller 33, and the like. Power supply cord PC is electrically connected to power supply circuit 34. Power supply cord PC has plug PG connected to the external power supply that supplies power supply circuit 34 with electric power.

Tube 80 is connected to body unit 10 so as to allow the washing liquid discharged by pump 31 to flow through tube 80. Washing unit 100 is connected to tube 80 so as to discharge the washing liquid. Washing unit 100 is detachably attached to body unit 10. Washing unit 100 is exemplarily joined to body unit 10 by magnetic force. FIG. 1 shows a state where washing unit 100 is attached to body unit 10. Washing unit 100 is detached from body unit 10 when washing unit 100 is used to wash the intraoral cavity.

Housing 21 of device body 20 includes a plurality of parts 22 joined together. Housing 21 is made of a material such as an acrylonitrile butadiene styrene (ABS) resin. The plurality of parts 22 includes upper lid 23, case body 30, bottom lid 24, and disposing portion 40. Respective parts 22 are individually molded products made of a resin material. Upper lid 23, bottom lid 24, and disposing portion 40 are each joined to case body 30. Upper lid 23 configures flat upper surface 23A of device body 20.

Disposing portion 40 is joined to case body 30 so as to allow tube 80 to be disposed in disposing portion 40 in the state where washing unit 100 is attached to body unit 10. Disposing portion 40 includes recess 41. Recess 41 is configured to accommodate tube 80. Recess 41 includes opening 41A opened to front face 30A of case body 30. Device body 20 can optionally exclude disposing portion 40.

Examples of tube 80 include an extensibly curled tube. It is preferred to determine a type of a material, a diameter, and a thickness of tube 80 in accordance with mobility of washing unit 100 to be moved around body unit 10, and durability of tube 80, for example. Examples of the material for tube 80 include a highly flexible resin material. The resin material is exemplified by ethylene vinyl acetate copolymer (EVA). The diameter of tube 80 is preferably within an exemplary range from 3.0 mm to 5.0 mm. The diameter of tube 80 can be 4.0 mm. The thickness of tube 80 is preferably within an exemplary range from 0.5 mm to 1.5 mm. The thickness of tube 80 can be 1.0 mm.

Washing unit 100 includes case 101 and nozzle 105. Nozzle 105 is provided at case 101 so as to discharge washing liquid. Case 101 is made of a material such as an ABS resin. Case 101 includes grip portion 102. Grip portion 102 is configured to be gripped by a single hand of a user. Case 101 includes first end portion 103 and second end portion 104. First end portion 103 has first end surface 103A. First end surface 103A is configured to allow nozzle 105 to be attached to first end surface 103A. Second end portion 104 is opposite to first end portion 103 of case 101. Second end portion 104 has second end surface 104A. Tube 80 is inserted to case 101 through second end surface 104A, for example, and is connected to an inlet of a passage for washing liquid which is provided in case 101. Nozzle 105 is connected to an outlet of the passage.

Washing unit 100 further includes first operation part 110 and first display part 120. First operation part 110 and first display part 120 are provided at grip portion 102. First operation part 110 is configured to select behavior of oral cleaning device 1 relevant mainly to discharge of washing liquid. First operation part 110 is electrically connected to controller 33 of body unit 10. First operation part 110 includes a plurality of buttons. The plurality of buttons includes first button 111, second button 112, third button 113, and fourth button 114. Respective buttons 111 to 114 are exemplarily provided on front face 102A of grip portion 102 and are aligned in a longitudinal direction of washing unit 100.

First button 111 is configured to power ON and power OFF body unit 10. Second button 112 is configured to open and close a check valve (not shown) provided in case 101. When second button 112 is operated to open the check valve, the washing liquid flowing through tube 80 is discharged from discharge port 105A of nozzle 105. When second button 112 is operated to close the check valve, no washing liquid is discharged from discharge port 105A of nozzle 105. Third button 113 is configured to increase hydraulic pressure of the washing liquid discharged from pump 31. Fourth button 114 is configured to decrease the hydraulic pressure of the washing liquid discharged from pump 31. Third button 113 and fourth button 114 are operated to regulate the hydraulic pressure of the washing liquid discharged from pump 31 within a range of discharge pressure of pump 31. The range of the discharge pressure of pump 31 is preferably from 3.0 kgf/cm$^2$ to 8.0 kgf/cm$^2$ or the like. The washing liquid discharged from discharge port 105A of nozzle 105 has hydraulic pressure varied in accordance with the hydraulic pressure of the washing liquid discharged from pump 31.

First display part 120 is configured to display information associated with operation of first operation part 110. First display part 120 is provided at grip portion 102. First display part 120 is exemplarily provided below first operation part 110 in front face 102A of grip portion 102 in the longitudinal direction of washing unit 100. First display part 120 includes a liquid crystal display. The liquid crystal display displays a power supply state of body unit 10, a level of the hydraulic pressure of the washing liquid discharged from pump 31, and the like. The user can thus easily recognize how oral cleaning device 1 is changed in behavior state by operation of first operation part 110.

Body unit 10 further includes second operation part 50 and second display part 60. Second operation part 50 is configured to select behavior of pump 31 relevant mainly to discharge of washing liquid. Second operation part 50 is provided at upper surface 23A of device body 20, for example. Second operation part 50 is electrically connected to controller 33. Second operation part 50 includes a plurality of buttons. The plurality of buttons includes first button 51, second button 52, and third button 53. First button 51 is substantially equal in function to first button 111 of washing unit 100. Second button 52 is substantially equal in function to third button 113 of washing unit 100. Third button 53 is substantially equal in function to fourth button 114 of washing unit 100. Washing unit 100 and body unit 10 each have operation parts 110, 50 for operation of pump 31, respectively. This configuration achieves improvement in operability of oral cleaning device 1.

Second display part 60 is configured to display information associated with operation of operation parts 50, 110. Second display part 60 is provided at upper surface 23A of device body 20, for example. Second display part 60 includes a plurality of light emitting diode (LED) lamps. The LED lamps each have a lighting state changed in accordance with the hydraulic pressure of the washing liquid regulated with use of second button 52 and third button 53. First display part 120 of washing unit 100 displays information changed in accordance with operation of first operation part 110 as well as in accordance with operation of second operation part 50.

Figure 2:
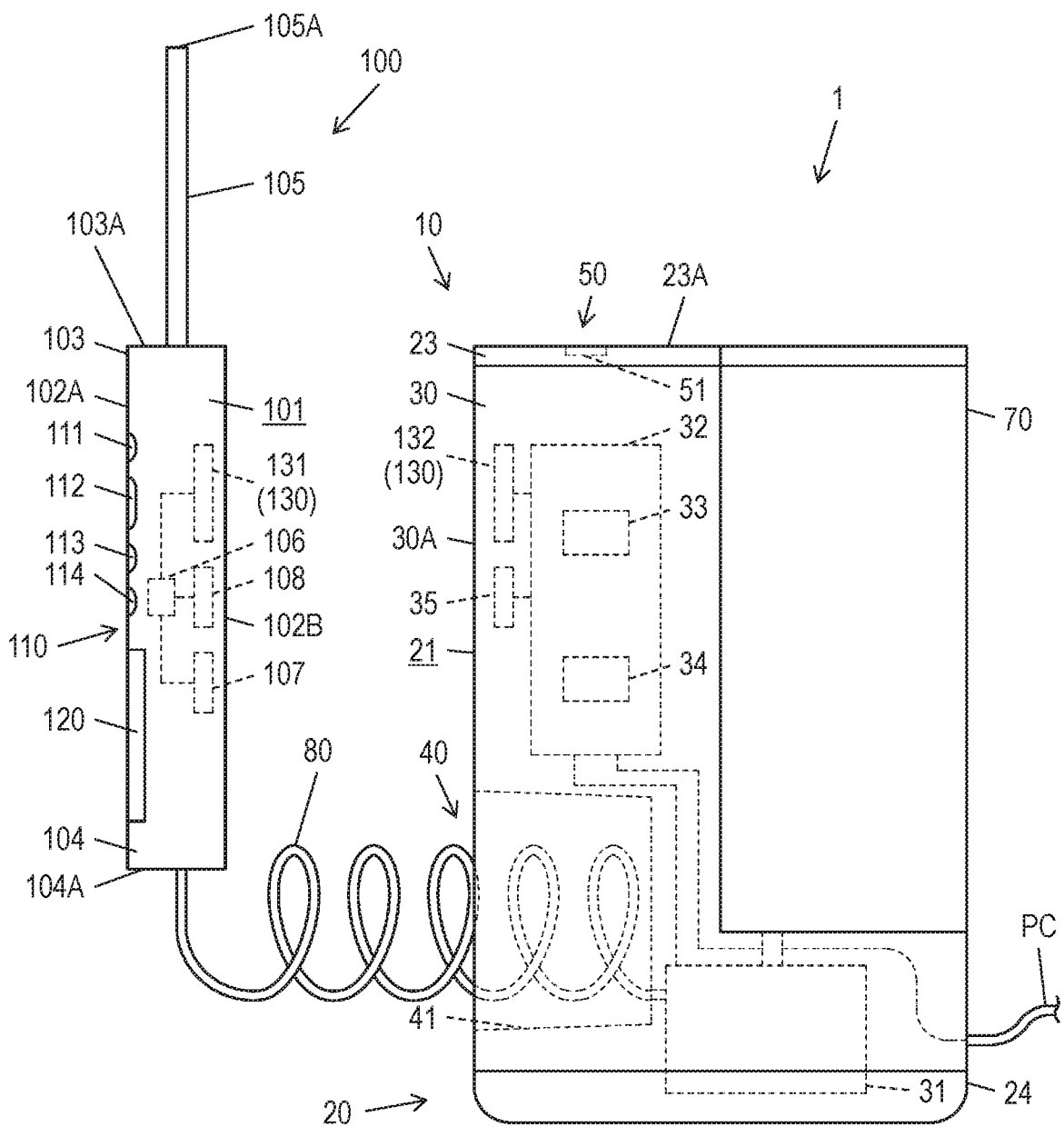
FIG. 2 is a schematic view showing an internal configuration of the oral cleaning device of FIG. 1.

FIG. 2 shows an internal configuration of oral cleaning device 1. Oral cleaning device 1 further includes communication unit 130. Communication unit 130 is configured to communicably connect first operation part 110 of washing unit 100 and controller 33. Communication unit 130 includes first wireless communication part 131 and second wireless communication part 132. First wireless communication part 131 is provided at washing unit 100 so as to transmit a wireless signal according to operation of first operation part 110. First wireless communication part 131 is preferably provided at grip portion 102 in an area distant from an area touched by a hand of the user using the washing unit in a normal manner. First wireless communication part 131 is exemplarily provided in an area close to first end portion 103 in grip portion 102. First wireless communication part 131 and second wireless communication part 132 will thus be kept in an excellent communication condition.

Second wireless communication part 132 is electrically connected to body circuit 32 of body unit 10. Second wireless communication part 132 is provided at body unit 10 so as to receive the wireless signal transmitted from first wireless communication part 131. Second wireless communication part 132 is exemplarily provided in case body 30 at a position close to front face 30A. First wireless communication part 131 and second wireless communication part 132 are thus close to each other to keep an excellent communication condition between first wireless communication part 131 and second wireless communication part 132.

Washing unit 100 includes control circuit 106 and power supply 107. Control circuit 106 is electrically connected to first operation part 110 of washing unit 100. Control circuit 106 is electrically connected to first button 111, third button 113, and fourth button 114, for example. Control circuit 106 transmits a signal according to operation of first operation part 110 to second wireless communication part 132 via first wireless communication part 131. Second wireless communication part 132 transmits a wireless signal received from first wireless communication part 131 to controller 33 of body unit 10. Controller 33 controls pump 31 in accordance with the wireless signal received by second wireless communication part 132. Washing unit 100 and body unit 10 can thus communicate with each other without connection between washing unit 100 and body unit 10 via any communication line. Oral cleaning device 1 can accordingly be simplified in wiring configuration.

Controller 33 controls behavior of pump 31 in the following manners in an exemplary case where first wireless communication part 131 and second wireless communication part 132 are under a poor communication condition. In a first example, controller 33 stops the behavior of pump 31. According to this example, pump 31 stops when operation of first operation part 110 of washing unit 100 may not be reflected accurately in behavior of pump 31. This configuration is less likely to cause washing unit 100 to discharge the washing liquid having pressure unintended by the user. In a second example, controller 33 invalidates operation of first operation part 110 of washing unit 100. This example achieves an effect substantially similar to the effect exerted in the first example.

Power supply 107 is configured to supply electric power to electrical elements included in washing unit 100. The electrical elements of washing unit 100 include control circuit 106, first wireless communication part 131, and the like. First wireless communication part 131 can thus operate without connection between washing unit 100 and the external power supply via any electric power line. Oral cleaning device 1 can accordingly be simplified in wiring configuration. Power supply 107 is detachably provided at case 101 of washing unit 100, for example. Examples of power supply 107 include a secondary battery.

Oral cleaning device 1 further includes power transmitter 35 and power receiver 108. Power transmitter 35 and power receiver 108 configure a contactless power transmission system. Power transmitter 35 is provided in case body 30 of body unit 10. Power transmitter 35 is exemplarily provided close to front face 30A of case body 30. Power receiver 108 is provided in case 101 of washing unit 100. Power receiver 108 is exemplarily provided close to rear face 102B of grip portion 102. Power transmitter 35 and power receiver 108 are positioned substantially equally in a height direction of oral cleaning device 1 in the state where washing unit 100 is attached to body unit 10. Power transmitter 35 and power receiver 108 are close to each other in the state where washing unit 100 is attached to body unit 10.

Power transmitter 35 is electrically connected to power supply circuit 34. Power transmitter 35 includes a primary coil (not shown). Power receiver 108 includes a secondary coil (not shown). The primary coil of power transmitter 35 exemplarily has a magnetic flux interlinked with the secondary coil of power receiver 108 in the state where washing unit 100 is attached to body unit 10. Electric power is accordingly transmitted from power transmitter 35 to power receiver 108. The electric power transmitted to power receiver 108 is supplied to power supply 107 to charge the secondary battery. In a case where washing unit 100 includes no power supply 107, the electric power transmitted to power receiver 108 is supplied to the electrical elements included in washing unit 100. First wireless communication part 131 can thus operate without connection between washing unit 100 and the external power supply via any electric power line. Oral cleaning device 1 can accordingly be simplified in wiring configuration.

Exemplary steps of using oral cleaning device 1 will be described with reference to FIG. 1.

Oral cleaning device 1 is used by a user in the following manner, for example. In a first step, a predetermined amount of the washing liquid is poured into tank 70, and tank 70 is attached to device body 20. In a second step, washing unit 100 is detached from body unit 10. In a third step, first button 111 of washing unit 100 or the like is operated to power ON oral cleaning device 1. When oral cleaning device 1 is powered ON, pump 31 (see FIG. 2) starts being driven. The third step can alternatively be executed before the second step. In a fourth step, discharge port 105A of nozzle 105 is directed to the intraoral cavity. In a fifth step, second button 112 of washing unit 100 is operated to discharge the washing liquid from discharge port 105A. The washing liquid discharged from discharge port 105A then washes the intraoral cavity.

In a case where the user feels that the hydraulic pressure of the washing liquid discharged from discharge port 105A is low or high in the fifth step, the user operates third button 113 or fourth button 114 of washing unit 100, for example, to regulate the hydraulic pressure of the washing liquid discharged from discharge port 105A. First operation part 110 for operation of pump 31 is provided at washing unit 100. The user can thus easily regulate the hydraulic pressure and the like of the washing liquid discharged from washing unit 100 that is washing the intraoral cavity. As described above, oral cleaning device 1 achieves improvement in operation usability. The power supply state of oral cleaning device 1 and the hydraulic pressure of the washing liquid discharged from discharge port 105A can be operated also by second operation part 50 of body unit 10.

(Modifications)

The exemplary embodiment describes the oral cleaning device in a practicable mode of the present disclosure, and does not intend to limit the mode. The present disclosure can include, in addition to the exemplary embodiment, following modifications of the exemplary embodiment, any mode achieved by combining at least two of the modifications having no conflict, and the like.

Disposition of first wireless communication part 131 in washing unit 100 can be changed appropriately. In a first example, first wireless communication part 131 is provided at first end portion 103 of grip portion 102. In a second example, first wireless communication part 131 is provided at second end portion 104 of grip portion 102. In a third example, first wireless communication part 131 is provided in an area close to second end portion 104 in grip portion 102.

First operation part 110 can be modified appropriately in terms of the configuration. In a first example, at least one of buttons 111 to 114 of first operation part 110 is a slidable switch. In a second example, first operation part 110 includes a voice input part. According to this example, controller 33 controls pump 31 in accordance with voice of the user input through the voice input part. Similar modifications are applicable also to second operation part 50.

The number of the operation parts included in oral cleaning device 1 can be changed appropriately. In a first example, first operation part 110 does not include one or two of first button 111, third button 113, and the fourth button 114. According to this example, second operation part 50 optionally excludes any of buttons 51 to 53 having the functions substantially equal to the functions of the buttons not excluded from first operation part 110. In a second example, second operation part 50 does not include at least one of first button 51, second button 52, and third button 53.

Oral cleaning device 1 can alternatively exclude at least one of first display part 120 and second display part 60.

Disposition of power transmitter 35 in body unit 10 can be changed appropriately. Power transmitter 35 is exemplarily provided in an area different from front face 30A in a side surface of case body 30. According to this example, electric power is transmitted from power transmitter 35 to power receiver 108 in a state where washing unit 100 is close to the area provided with power transmitter 35 in the side surface of case body 30. Oral cleaning device 1 can optionally exclude power transmitter 35 and power receiver 108.

Communication unit 130 can be modified appropriately in terms of the configuration. Communication unit 130 exemplarily includes a communication line wiredly connecting between washing unit 100 and body unit 10. The communication line is provided to pass through tube 80 or through a tube different from tube 80.

The oral cleaning device according to the present disclosure is applicable to any type of an oral cleaning device for home use, business use, or the like.

What is claimed is:

1. An oral cleaning device comprising:
   a body unit including a pump configured to discharge washing liquid;
   a tube connected to the body unit to allow the discharged washing liquid to flow through the tube;
   a washing unit connected to the tube to discharge the washing liquid;
   a first operation part provided at the washing unit;
   a controller provided at the body unit and configured to control the pump in accordance with operation of the first operation part; and
   a communication unit configured to establish a communication connection between the first operation part and the controller, wherein:
   the communication unit includes a first wireless communication part provided at the washing unit to transmit a wireless signal according to an operation of the first operation part, and a second wireless communication part provided at the body unit to receive the wireless signal,
   the controller controls an operation of the pump in accordance with the wireless signal received by the second wireless communication part, and
   the controller stops the pump when a communication condition between the first wireless communication part and the second wireless communication part is poor.

2. The oral cleaning device according to claim 1, wherein the washing unit further includes a power supply configured to supply the first wireless communication part with electric power.

3. The oral cleaning device according to claim 1, wherein the washing unit further includes a display part configured to display information associated with operation of the first operation part.

4. The oral cleaning device according to claim 1, further comprising a power transmission system,
   wherein the washing unit further includes a power receiver for wirelessly receiving power from the body unit.

5. The oral cleaning device according to claim 1, wherein the body unit further includes a second operation part configured to select operations of the pump.

6. An oral cleaning device comprising:

a body unit including a pump configured to discharge washing liquid;

a tube connected to the body unit to allow the discharged washing liquid to flow through the tube;

a washing unit connected to the tube to discharge the washing liquid;

a first operation part provided at the washing unit;

a controller provided at the body unit and configured to control the pump in accordance with operation of the first operation part; and a communication unit configured to establish a communication connection between the first operation part and the controller, wherein:

the communication unit includes a first wireless communication part provided at the washing unit to transmit a wireless signal according to an operation of the first operation part, and a second wireless communication part provided at the body unit to receive the wireless signal, the controller controls an operation of the pump in accordance with the wireless signal received by the second wireless communication part, the washing unit includes a grip portion, and the first wireless communication part is provided at an end portion of the grip portion or close to the end portion in the grip portion.

7. The oral cleaning device of claim 6, wherein the first wireless communication part is provided at an end portion of the grip portion.

8. The oral cleaning device according to claim 6, wherein the washing unit further includes a power supply configured to supply the first wireless communication part with electric power.

9. The oral cleaning device according to claim 6, wherein the washing unit further includes a display part configured to display information associated with operation of the first operation part.

10. The oral cleaning device according to claim 6, further comprising a power transmission system, wherein the washing unit further includes a power receiver for wirelessly receiving power from the body unit.

11. The oral cleaning device according to claim 6, wherein the body unit further includes a second operation part configured to select operations of the pump.

12. The oral cleaning device according to claim 6, wherein the controller stops the pump when a communication condition between the first wireless communication part and the second wireless communication part is poor.

* * * * *